United States Patent
Chen

(10) Patent No.: US 8,207,938 B2
(45) Date of Patent: Jun. 26, 2012

(54) SIGNAL FILTERING METHOD AND ELECTRONIC DEVICE

(75) Inventor: Hsi-Kun Chen, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 724 days.

(21) Appl. No.: 12/349,656

(22) Filed: Jan. 7, 2009

(65) Prior Publication Data

US 2009/0284466 A1 Nov. 19, 2009

(30) Foreign Application Priority Data

May 16, 2008 (TW) ................................. 97118175 A

(51) Int. Cl.
*G09G 5/08* (2006.01)
(52) U.S. Cl. .................. 345/157; 345/156; 708/300
(58) Field of Classification Search .................. None
See application file for complete search history.

(56) References Cited

U.S. PATENT DOCUMENTS

| | | | |
|---|---|---|---|
| 5,007,099 A * | 4/1991 | Matsushima et al. | 382/260 |
| 5,146,210 A * | 9/1992 | Heberle | 715/856 |
| 5,604,856 A * | 2/1997 | Guenter | 345/473 |
| 5,825,351 A | 10/1998 | Tam | |
| 5,880,411 A * | 3/1999 | Gillespie et al. | 178/18.01 |
| 6,320,528 B1 * | 11/2001 | Michel | 341/144 |
| 6,411,278 B1 | 6/2002 | Kage et al. | |
| 6,650,314 B2 * | 11/2003 | Philipson | 345/157 |
| 6,730,863 B1 | 5/2004 | Gerpheide et al. | |
| 7,075,514 B2 * | 7/2006 | Tanaka | 345/157 |
| 7,259,756 B2 * | 8/2007 | Park et al. | 345/204 |
| 7,321,637 B2 * | 1/2008 | Kuzumoto | 375/317 |
| 7,333,092 B2 | 2/2008 | Zadesky et al. | |
| 7,414,611 B2 * | 8/2008 | Liberty | 345/158 |
| 7,583,388 B2 * | 9/2009 | Seko et al. | 356/498 |
| 7,834,848 B2 * | 11/2010 | Ohta | 345/157 |
| 2005/0110768 A1 | 5/2005 | Marriott et al. | |
| 2007/0091077 A1 | 4/2007 | Lii et al. | |
| 2007/0133006 A1 * | 6/2007 | Seko et al. | 356/498 |
| 2007/0262989 A1 * | 11/2007 | Buyanovskiy | 345/426 |

(Continued)

FOREIGN PATENT DOCUMENTS

EP 0789317 8/1997

(Continued)

OTHER PUBLICATIONS

TW Office Action dated Feb. 9, 2012.

(Continued)

*Primary Examiner* — Dismery Mercedes
(74) *Attorney, Agent, or Firm* — Thomas|Kayden

(57) ABSTRACT

A signal filtering method for filtering signals obtained at a number of time points by an electronic device is provided. Each of the signals corresponds to an i-th value at an i-th time point of the abovementioned time points, and the i-th value and an (i+1)-th value are defined as an i-th ordering sequence, wherein i is a positive integer. Each of the i-th ordering sequence and an (i+1)-th ordering sequence conforms to a first strict monotonicity. The method includes the following steps. Firstly, whether an (i+2)-th ordering sequence conforms to a second strict monotonicity is determined. If yes, then execute the next step. Determine whether an (i+3)-th ordering sequence conforms to the second strict monotonicity. If not, a signal obtained at an (i+3)-th time point is deleted.

22 Claims, 5 Drawing Sheets

U.S. PATENT DOCUMENTS

| | | |
|---|---|---|
| 2008/0048997 A1 | 2/2008 | Gillespie et al. |
| 2009/0283338 A1* | 11/2009 | Chen .................... 178/18.03 |
| 2010/0324862 A1 | 12/2010 | Sato et al. |

FOREIGN PATENT DOCUMENTS

| | | |
|---|---|---|
| TW | 200634635 | 10/2006 |
| TW | 1277721 | 4/2007 |
| TW | 1295785 | 4/2008 |
| WO | 9309522 | 5/1993 |

OTHER PUBLICATIONS

English language Abstract of TW200634635 (published Oct. 1, 2006).

* cited by examiner

SIGNAL FILTERING METHOD AND ELECTRONIC DEVICE

This application claims the benefit of Taiwan application Serial No. 97118175, filed on May 16, 2008, the subject matter of which is incorporated herein by reference.

BACKGROUND OF THE INVENTION

1. Field of the Invention

The invention relates in general to a signal processing method and an electronic device, and more particularly to a signal filtering method and an electronic device.

2. Description of the Related Art

In recent years, the development in mobile technology has brought huge potential to the market of electronic devices. For example, the electronic device, such as personal digital assistants, (PDA), smartphone and touch phone, has become a necessity to people's life.

In order to operate the electronic device, conventional electronic device is equipped with mechanic buttons for the user to operate with. In addition, electronic devices with sensing elements are also available in the market. The sensing element may include a number of capacitive sensors. When the user places his or her finger on the sensing element and applies a pressure thereon, the corresponding capacitive sensor sense variations so that the positions touched by the finger can be identified. Moreover, the moving direction of the finger on the sensing element such as clockwise or anti-clockwise may also be identified by way of continuous sensing. Thus, when the user operates the electronic device, he or she only needs to press or slide on the sensing element with one finger so as to operate the electronic device such as moving the cursor, adjusting the volume or selecting the song.

However, when such sensing element is used, the electronic device may encounter the problem of unstable operation due to the reasons being simply stated hereinbelow. Because the electronic device has complicated circuits, the signals obtained by sensing wheel will be interfered when signals are transmitted between circuits. Furthermore, when the electronic device normally uses high power telecommunication, signal interference will occur and the sensing element will sense a large volume of noises. Also, the electronic device will become unstable when affected by temperature and moisture or when the sensing element senses unexpected signals caused by user's improper operation. Thus, it is an important subject in the industry to enhance the operation stability of the electronic device equipped with the sensing element and thus to enhance the usability for the user.

SUMMARY OF THE INVENTION

It is an object of the invention to filter signals obtained by the electronic device, so that the operation stability of the electronic device can be enhanced, and the usability for the user can be thus enhanced.

According to a first aspect of the present invention, a signal filtering method is provided for filtering a number of signals obtained by an electronic device at a number of time points. Each of the signals obtained at an i-th time point of the above time points corresponds to an i-th value, and the i-th value and an (i+1)-th value are defined as an i-th ordering sequence, wherein i is a positive integer. Each of the i-th ordering sequence and an (i+1)-th ordering sequence conforms to a first strict monotonicity. The method includes the following steps. Firstly, whether an (i+2)-th ordering sequence conforms to a second strict monotonicity is determined: if yes, then the following step is executed. Then, whether an (i+3)-th ordering sequence conforms to the second strict monotonicity is determined: if not, a signal obtained at an (i+3)-th time point is deleted.

According to a second aspect of the present invention, an electronic device including a fetching unit, a determining unit and a filtering unit is provided. The fetching unit is for fetching a number of signals obtained at a number of time points having an equal interval between two adjacent time points. Each of the signals corresponds to an i-th value at an i-th time point of the abovementioned time points, and the i-th value and an (i+1)-th value are defined as an i-th ordering sequence, wherein i is a positive integer. Each of the i-th ordering sequence and an (i+1)-th ordering sequence conforms to a first strict monotonicity. The determining unit is used for determining whether an (i+2)-th ordering sequence conforms to a second strict monotonicity, and for determining whether an (i+3)-th ordering sequence conforms to the second strict monotonicity. The filtering unit is provided for filtering the signals obtained by the fetching unit. If the determining unit determines that the (i+2)-th ordering sequence conforms to the second strict monotonicity but determines that the (i+3)-th ordering sequence does not conform to the second strict monotonicity, then the filtering unit deletes a signal obtained at an (i+3)-th time point.

According to a third aspect of the present invention, an electronic device is provided for executing an application program to filter a number of signals obtained at a number of time points having an equal interval between two adjacent time points. Each of the signals obtained at an i-th time point of the above time points corresponds to an i-th value, the i-th value and an (i+1)-th value are defined as an i-th ordering sequence, wherein i is a positive integer. Each of the i-th ordering sequence and an (i+1)-th ordering sequence conforms to a first strict monotonicity. The electronic device includes a memory and a processor. The memory is for storing a programming code of an operating system. The processor is used for reading and executing the programming code of the operating system, and for executing the application program to filter the signals. The processor is used for determining whether an (i+2)-th ordering sequence conforms to a second strict monotonicity, and for determining whether an (i+3)-th ordering sequence conforms to the second strict monotonicity. If the processor determined that the (i+2)-th ordering sequence conforms to the second strict monotonicity but the (i+3)-th ordering sequence does not conform to the second strict monotonicity, then the processor deletes a signal obtained at an (i+3)-th time point.

The invention will become apparent from the following detailed description of the preferred but non-limiting embodiments. The following description is made with reference to the accompanying drawings.

DETAILED DESCRIPTION OF THE INVENTION

First Embodiment

Figure 1:
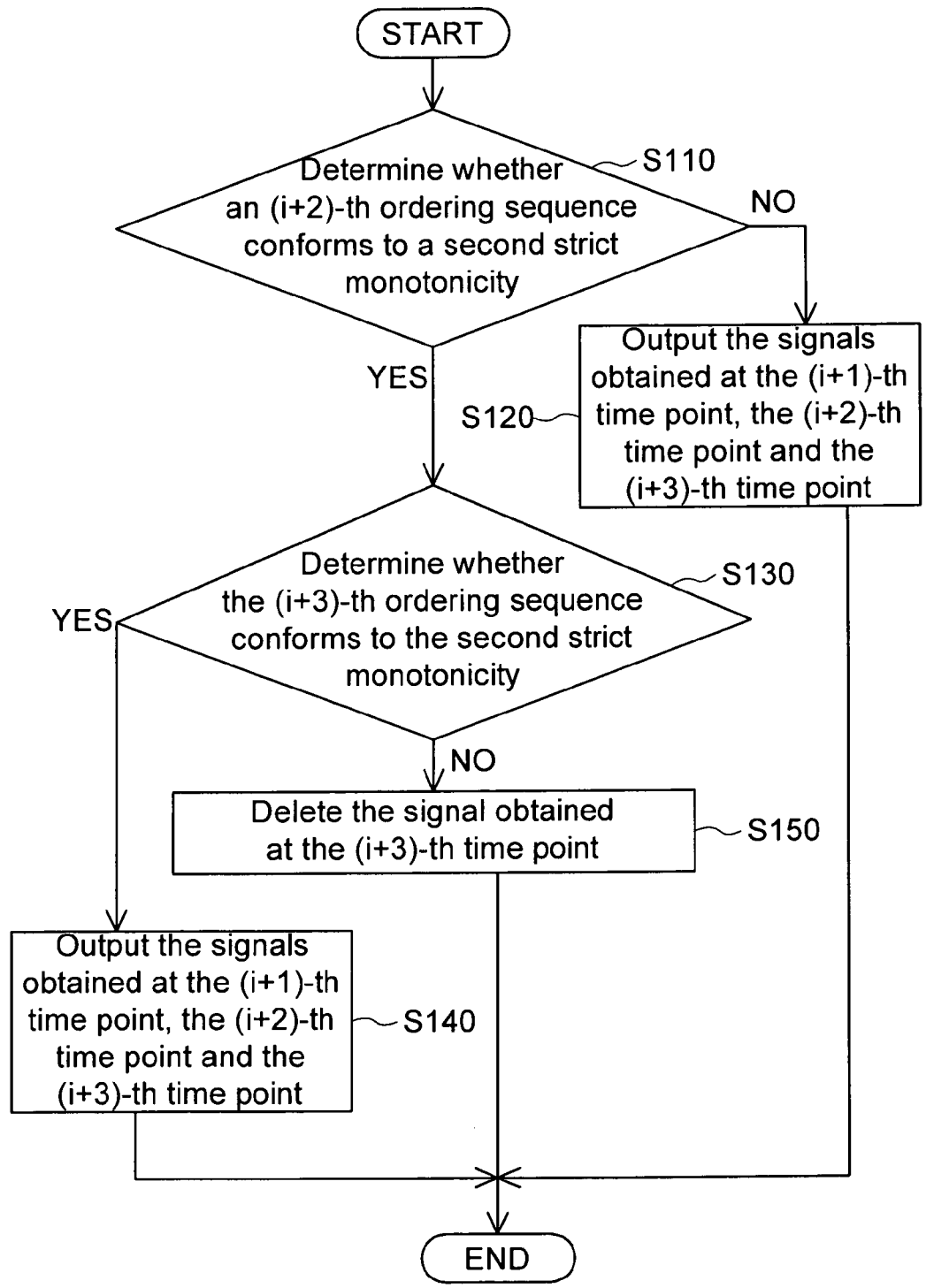
FIG. 1 shows a flowchart of a signal filtering method used in an electronic device according to a first embodiment of the invention.

The first embodiment of the invention provides a signal filtering method for filtering a number of signals obtained by an electronic device at a number of time points. Each of the signals obtained at an i-th time point of the above time points corresponds to an i-th value, and the i-th value and an (i+1)-th value are defined as an i-th ordering sequence, wherein i is a positive integer. Each of the i-th ordering sequence and an (i+1)-th ordering sequence conforms to a first strict monotonicity. FIG. 1 shows a flowchart of a signal filtering method applied to an electronic device according to the first embodiment of the invention. Referring to FIG. 1, the method includes the following steps.

The method begins at step S110, whether an (i+2)-th ordering sequence conforms to a second strict monotonicity is determined: if not, then proceed to step S120, the signals obtained at the (i+1)-th time point, the (i+2)-th time point and the (i+3)-th time point are outputted; if yes, then proceed to step S130.

In step S130, whether the (i+3)-th ordering sequence conforms to the second strict monotonicity is determined: if yes, then proceed to step S140, the signals obtained at the (i+1)-th time point, the (i+2)-th time point and the (i+3)-th time point are outputted; if not, then proceed to step S150, the signal obtained at the (i+3)-th time point is deleted.

Preferably, before step S110, the method further includes the following step. Whether the two values of the (i+2)-th ordering sequence are equal to each other is determined: if yes, the signal obtained at the (i+3)-th time point is deleted; if not, then proceed to step S110. Before step S130, the method further includes the following step. Whether the two values of the (i+3)-th ordering sequence are equal to each other is determined: if yes, the signals obtained at the (i+4)-th time point is deleted; if not, then proceed to step S130.

Figure 2:
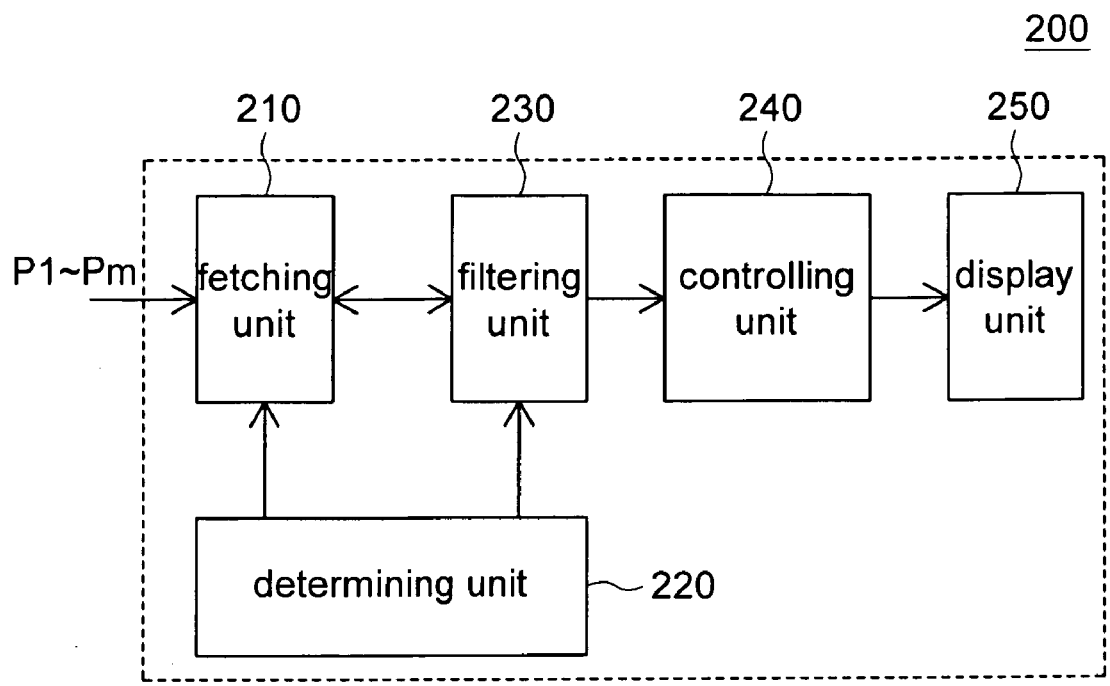
FIG. 2 shows an electronic device using a signal filtering method according to the first embodiment of the invention.

The electronic device using the signal filtering method of the invention is described below. FIG. 2 shows an electronic device using a signal filtering method according to the first embodiment of the invention. Referring to FIG. 2, the electronic device 200 includes a fetching unit 210, a determining unit 220, a filtering unit 230, a controlling unit 240, and a display unit 250. The function and operation of each unit are disclosed below.

The fetching unit 210 is for obtaining a number of signals P1~Pm at a number of time points having an equal interval between two adjacent time points, wherein each of the signals P1~Pm obtained at an i-th time point of the above time points corresponds to an i-th value, i is a positive integer, and each of the i-th ordering sequence and an (i+1)-th ordering sequence conforms to a first strict monotonicity. The determining unit 220 is used for determining whether an (i+2)-th ordering sequence conforms to a second strict monotonicity, and for determining whether an (i+3)-th ordering sequence conforms to the second strict monotonicity. The filtering unit 230 is provided for filtering the signals P1~Pm obtained by the fetching unit 210. If the determining unit 220 determines that the (i+2)-th ordering sequence conforms to the second strict monotonicity but the (i+3)-th ordering sequence does not conform to the second strict monotonicity, then the filtering unit 230 deletes a signal obtained at an (i+3)-th time point.

If the determining unit 220 determines that the (i+2)-th ordering sequence does not conform to the second strict monotonicity, the filtering unit 230 outputs the signals obtained at the (i+1)-th time point, the (i+2)-th time point and the (i+3)-th time point. If the determining unit 220 determines that the (i+3)-th ordering sequence does not conform to the second strict monotonicity, the filtering unit 230 outputs the signals obtained at the (i+2)-th time point, the (i+3)-th time point and the (i+4)-th time point. The display unit 250 is used for displaying a frame. The controlling unit 240 is used for determining a control mode according to the signals outputted from the filtering unit 230 to control the frame displayed by the display unit 250.

Figure 3A:
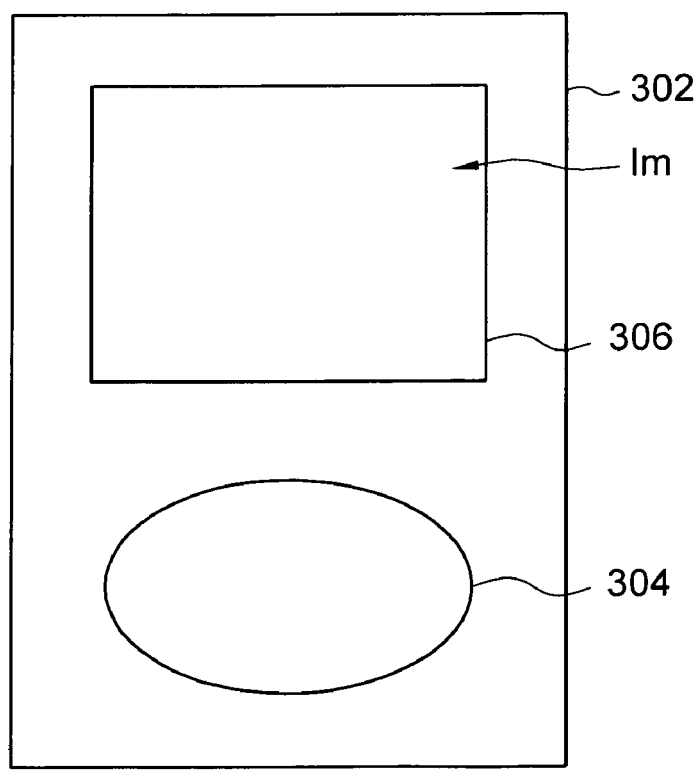
FIG. 3A shows an example of an electronic device according to the first embodiment of the invention.

The operations between the display unit 250, the controlling unit 240 and the fetching unit 210 are described below. The display unit 250 includes, for example, a display screen, and the fetching unit 210 includes, for example, a sensing wheel. FIG. 3A shows an example of an electronic device according to the first embodiment of the invention. Referring to FIG. 3A, in the present embodiment, the electronic device 300 has a casing 302, a sensing wheel 304, a display screen 306 and a controlling unit (not illustrated in FIG. 3A). The sensing wheel 304 is used for obtaining a number of signals each corresponding to a value. The controlling unit disposed in the casing 302 controls the frame Im displayed on the display screen 306 according to the control mode. The frame Im is a one-dimensional frame or a two dimensional frame. The frame Im has a cursor, and the control mode is a direction mode. The direction mode is used for controlling the cursor's moving direction in the frame Im.

Figure 3B:
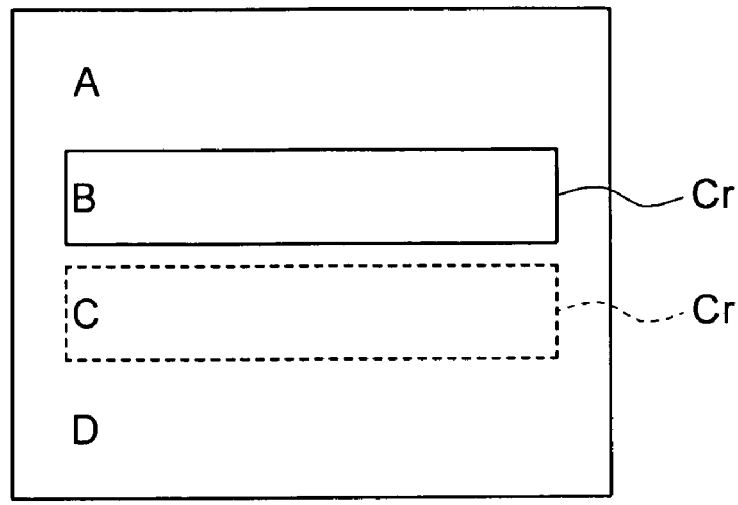
FIG. 3B and FIG. 3C respectively show an example of the frame displayed by the electronic device according to the first embodiment of the invention.

FIG. 3B shows an example of the frame displayed by the electronic device according to the first embodiment of the invention. Referring to FIG. 3B, in the present embodiment, the frame Ima is a one-dimensional frame, and the direction mode is used for controlling the cursor Cr to move forward or backward in the one-dimensional frame. For example, the frame Ima has many options A~D arranged in a row. The cursor Cr is indicated at the current option such as option B. At this time, if the signals obtained by the sensing wheel 304 are filtered, and then are determined by the controlling unit as the signals for controlling the cursor Cr to move forward in the frame Ima, then the cursor Cr will be indicated at option C. To the contrary, if the signals are determined by the controlling unit as the signals for controlling the cursor Cr to move backward in the frame Ima, then the cursor Cr will be indicated at option A. Thus, the signals obtained by the sensing wheel 304 can be used for determining the direction mode to control the cursor Cr to move forward or backward in the frame Ima.

Figure 3C:
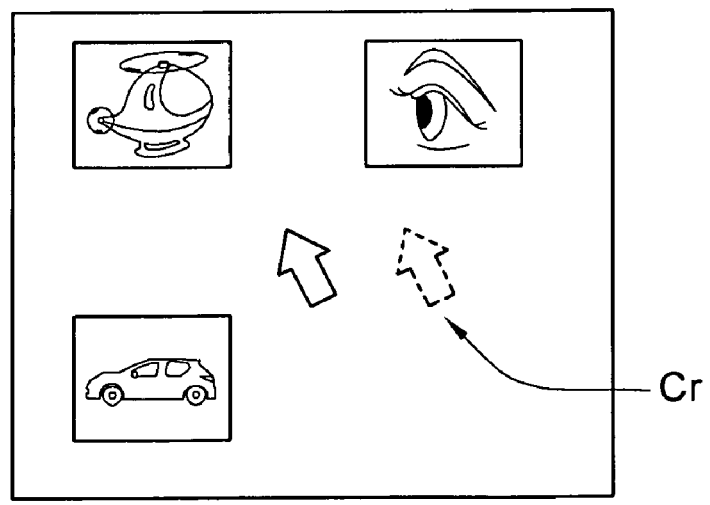

FIG. 3C shows another example of a frame displayed by an electronic device according to the first embodiment of the invention. Referring to FIG. 3C, in the present embodiment, the frame Imb is a two-dimensional frame, and the direction mode is used for controlling the coordinate of the cursor Cr in the two-dimensional frame. For example, the frame Imb is a window frame. If the signals obtained by the sensing wheel 304 are filtered and then determined by the controlling unit as the signals for controlling the cursor Cr to move rightward in the frame Imb, then the cursor Cr will move rightward in the window frame. Similarly, the signal obtained by the sensing wheel 304 can make the cursor Cr move upward or downward so as to control the coordinate of the cursor Cr in the frame Imb.

The abovementioned sensing wheel is a capacitive sensing wheel for example, but the invention is not limited thereto.

For example, the sensing wheel includes many sensors enclosing a ring, and each sensor preferably corresponds to a value or corresponds to a value converted from the coordinate of the sensor. When the sensing wheel senses a signal (for example, when the user's finger slides on the sensing wheel), the sensor activated by an external force will transmit a corresponding value.

If the user's finger slides on the sensing wheel along a first direction such as a clockwise direction, the signals sensed by the sensing wheel correspond to a number of values having a first strict monotonicity. If the user's finger slides on the sensing wheel along a second direction such as an anti-clockwise direction, the signals sensed by the sensing wheel correspond to a number of values having a second strict monotonicity. However, when the sensing wheel is not applied with the external force but is interfered by the noise (e.g., interfered by the high-frequency signal), the sensing wheel may still sense signals. Thus, the signal obtained by the sensing wheel may include the signals generated by the user's operation and the signals generated by the noise.

The electronic device using the signal filtering method of the first embodiment of the invention is exemplified below by a number of examples. In a first example, the sensing wheel obtains a number of signals at a number of time points t1~t5 having an equal interval between two adjacent time points, such as time points t1 and t2, and the corresponding values of the signals are {d1, d2, d3, d4, d5}, wherein d1<d2<d3>d4<d5. In the present example, the first strict monotonicity is strict monotonic increasing, the first ordering sequence {d1, d2} (d1<d2) conforms to strict monotonic increasing, the second ordering sequence {d2, d3} (d2<d3) also conforms to strict monotonic increasing.

Then, the determining unit determines whether the third ordering sequence {d3, d4} conforms to a second strict monotonicity. In the present example, the second strict monotonicity is strict monotonic decreasing. Because the third ordering sequence {d3, d4} (d3>d4) conforms to strict monotonic decreasing, the determining unit will again determine whether the fourth ordering sequence {d4, d5} conforms to strict monotonic decreasing. Because the fourth ordering sequence (d4<d5) does not conform to strict monotonic decreasing, the filtering unit will remove the signal obtained the fourth time point t4, that is, the filtering unit removes {d4}. The corresponding values of the filtered signals are {d1, d2, d3, d5} (d1<d2<d3<d5).

In a second example, the sensing wheel obtains a number of signals at a number of time points t1~t5 having an equal interval between two adjacent time points, and the corresponding values of the signals are {d1, d2, d3, d4, d5}, wherein d1<d2<d3=d4<d5. The second example differs with the first example in that the determining unit will determine whether the two values of the third ordering sequence {d3, d4} are equal to each other. In the present example, because the two values of the third ordering sequence {d3, d4} (d3=d4) are equal to each other, the filtering unit will remove the signals obtained at the fourth time point t4, that is, the filtering unit removes {d4}. The corresponding values of the filtered signals are {d1, d2, d3, d5} (d1<d2<d3<d5).

In a third example, the sensing wheel senses a number of signals at a number of time points t1~t5 having an equal interval, and the corresponding values of the signals are {d1, d2, d3, d4, d5}, wherein d1<d2<d3<d4=d5. The third example differs with the first example in that the determining unit will determine whether the two values of the fourth ordering sequence {d4, d5} are equal to each other. In the present example, as the two values of the fourth ordering sequence {d4, d5} (d4=d5) are equal to each other, the filtering unit will remove the signal obtained the fifth time point t5, that is, the filtering unit removes {d5}. The corresponding values of the filtered signals are {d1, d2, d3, d4} (d1<d2<d3<d4).

In a fourth example, the sensing wheel senses a number of signals at a number of time points having an equal interval t1~t5, and the corresponding values of the signals are {d1, d2, d3, d4, d5}, wherein d1<d2<d3>d4>d5. The fourth example differs with the first example in that the fourth ordering sequence (d4>d5) conforms to strict monotonic decreasing, therefore no signal will be deleted. The corresponding values of the filtered signals are {d1, d2, d3, d4, d5} (d1<d2<d3>d4>d5).

In the above four examples, if the corresponding values of the signals conform to strict monotonic increasing, then the controlling unit will control the cursor Cr to move forward in the frame Ima of FIG. 3B; if the corresponding values of the signals conform to strict monotonic decreasing, then the controlling unit will control the cursor Cr to move backward in the frame Ima of FIG. 3B. In the first example, the corresponding values of the filtered signals are {d1, d2, d3, d5} (d1<d2<d3<d5) and conform to strict monotonic increasing, so the controlling unit will control the cursor Cr to move forward in the frame Ima. In the second and the third example, the corresponding values of the filtered signals are respectively {d1, d2, d3, d5} (d1<d2<d3<d5) and {d1, d2, d3} (d1<d2<d3), and both conform to strict monotonic increasing, so the controlling unit will also control the cursor Cr to move forward in the frame Ima.

Similarly, in the fourth example, the corresponding values of the filtered signals are {d1, d2, d3, d4, d5} (d1<d2<d3>d4>d5), and the first three values {d1, d2, d3} (d1<d2<d3) conform to strict monotonic increasing, so the controlling unit will control the cursor Cr to move forward in the frame Ima. Contrarily, the last three values {d3, d4, d5} (d3>d4>d5) have strict monotonic decreasing, so the controlling unit will control the cursor Cr to move backward in the frame Ima. Therefore, in the present example, the cursor Cr will first move forward and then move backward next.

In the above examples, if the signals obtained by the sensing wheel are not filtered, the electronic device will execute unnecessary movements and make the device unstable. For example, in the first example, if the signal {d4} obtained at the fourth time point is not deleted, then the strict monotonic decreasing of the third ordering sequence {d3, d4} (d3>d4) will make the cursor move backward in the frame. As a consequence, the cursor which was originally moving forward will suddenly move backward and then resume the state of moving forward, making the frame unstable. The signal filtering method of the present embodiment of the invention is capable of removing unnecessary signals, assures the stable operation of the device, avoids noise interference, and filters out unnecessary signals generated due to improper operation, hence improving system stability.

Figure 4:
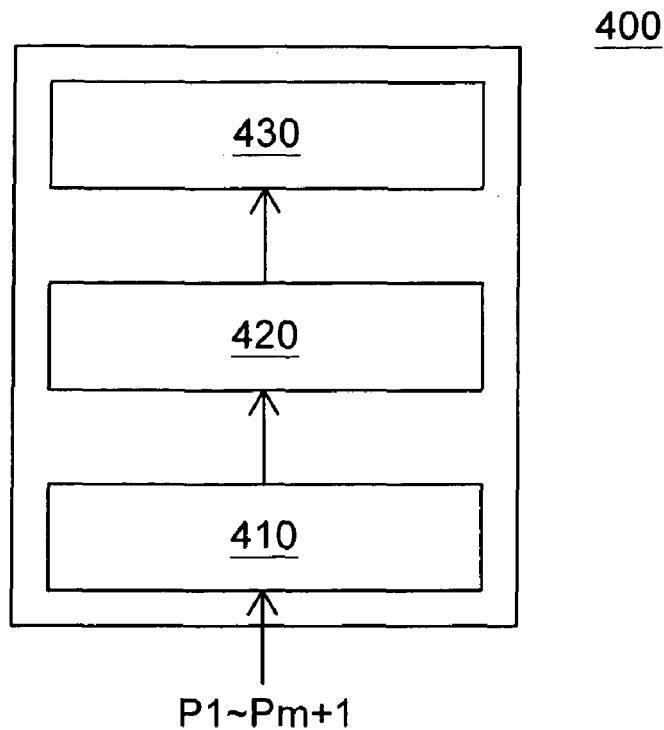
FIG. 4 shows a block diagram of an electronic device using a signal filtering method of the invention.

Also, the invention provides an electronic device for executing the signal filtering method. The steps of the signal filtering method are disclosed in the first embodiment and are not repeated here. FIG. 4 shows a block diagram of an electronic device using a signal filtering method of the invention. Referring to FIG. 4, the electronic device 400 includes an input layer 410, a driving layer 420 and an application layer 430. The input layer 410 is used for obtaining a number of signals P1~Pm at a number of time points. The driving layer 420 is used for receiving the signals P1~Pm and executing an operating system. The application layer 430, when controlled by the driving layer 420, executes an application program. The signal filtering method of the invention can be implemented in one of the input layer 410, the driving layer 420 and the application layer 430. How the signal filtering method is executed in the electronic device is exemplified in the following embodiments.

Second Embodiment

Referring to FIG. 4, in the present embodiment of the invention, the signal filtering method is implemented in the input layer 410. The input layer 410 is a sensing module. The sensing module has a fetching unit, a microprocessor and a memory. The sensing module executes the signal filtering method of the invention by the microprocessor. The driving layer 420 includes a processor.

Figure 5:
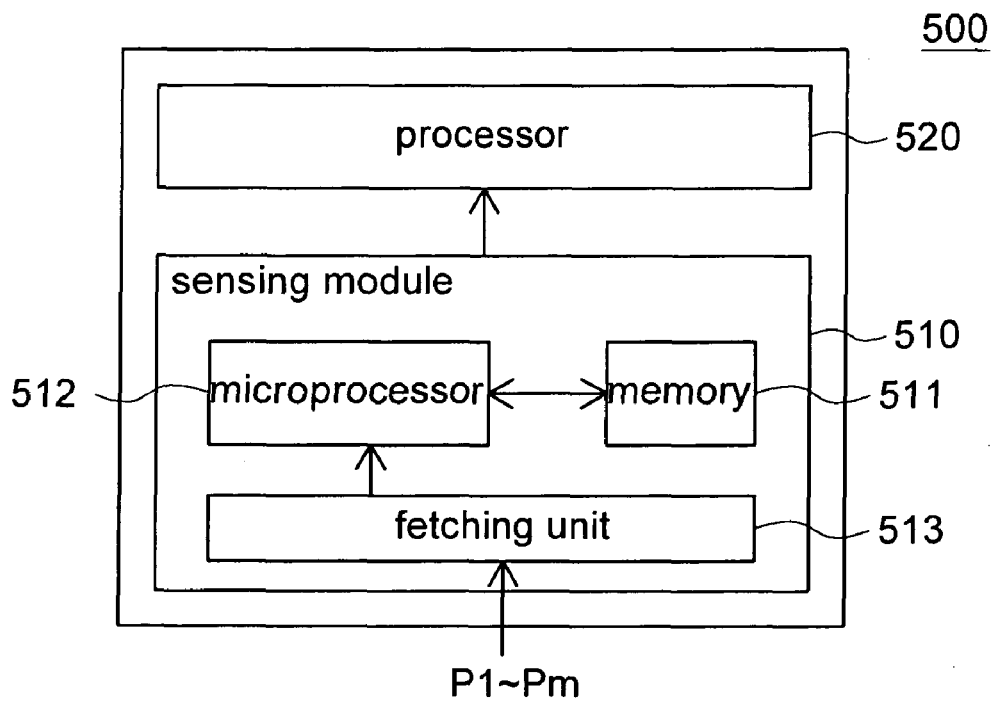
FIG. 5 shows an electronic device according to a second embodiment of the invention.

FIG. 5 shows an electronic device according to a second embodiment of the invention. Referring to FIG. 5, the electronic device 500 includes a sensing module 510 and a processor 520. The sensing module 510 includes a fetching unit 513, a memory 511 and a microprocessor 512. The fetching unit 513 is used for obtaining a number of signals P1~Pm at a number of time points having an equal interval between two adjacent time points. Each of the signals P1~Pm obtained at an i-th time point of the above time points corresponds to an i-th value, wherein i is a positive integer, and each of the i-th ordering sequence and an (i+1)-th ordering sequence conforms to a first strict monotonicity. The memory 511 is used for storing a programming code. The microprocessor 512 is used for reading and executing the programming code, and then is used for filtering the signals P1~Pm. The microprocessor 512 is used for determining whether an (i+2)-th ordering sequence conforms to a second strict monotonicity, and for determining whether an (i+3)-th ordering sequence conforms to the second strict monotonicity. If the microprocessor 512 determines that the (i+2)-th ordering sequence conforms to the second strict monotonicity but determines that the (i+3)-th ordering sequence does not conform to the second strict monotonicity, then the microprocessor 512 deletes a signal obtained at an (i+3)-th time point. The processor 520 is used for receiving the signals filtered by the sensing module 510. In practical, the processor 520 may be a high-level microcontroller, and the microprocessor 512 may be a low-level microcontroller.

In the present embodiment of the invention, the signal filtering method is implemented in the sensing module which is for obtaining external data. After obtaining signals, the sensing module filters the obtained signals without transmitting the signals to another unit such as the driving layer 420. Therefore, the present embodiment of the invention has high efficiency in processing signals, and is advantageous to the real-time processing. The signals will not be transmitted to the driving layer 420 before having been filtered first, so the signals, which could be noises and need to be deleted, will not be transmitted. Thus, the electronic device can be stably controlled according to the present embodiment.

Third Embodiment

Referring to FIG. 4, in the present embodiment of the invention, the signal filtering method is implemented in the driving layer 420. The input layer 410 is a sensing module, and the driving layer 420 is a processing module. The processing module is used for executing an operating system so as to execute the signal filtering method of the invention.

Figure 6:
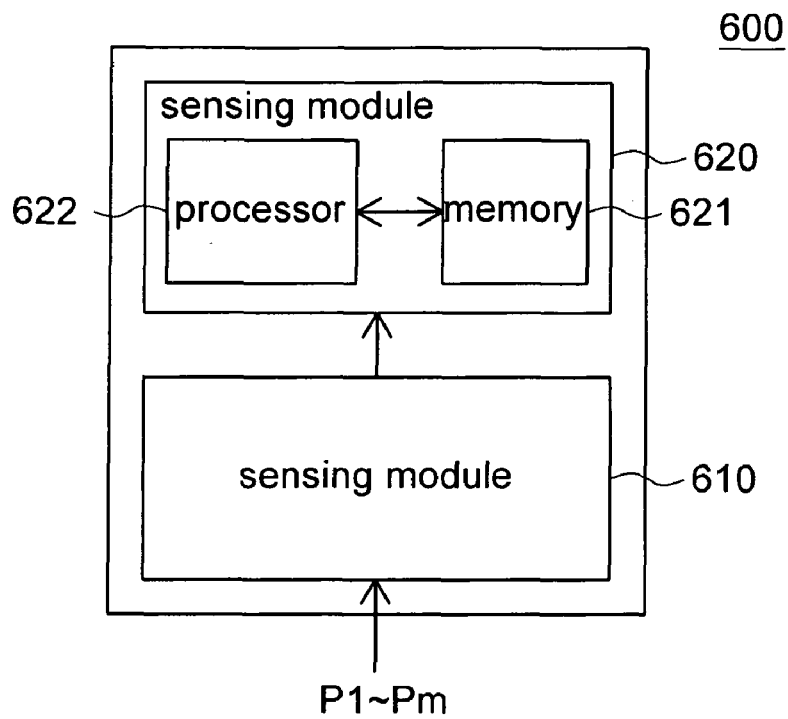
FIG. 6 shows an electronic device according to a third embodiment of the invention.

FIG. 6 shows an electronic device according to a third embodiment of the invention. Referring to FIG. 6, the electronic device 600 includes a sensing module 610 and a processing module 620. The sensing module 610 is used for executing the application program to filter a number of signals P1~Pm obtained at a number of time points having an equal interval between two adjacent time points. Each of the signals P1~Pm obtained at an i-th time point of the above-mentioned time points correspond to an i-th value, wherein i is a positive integer, and each of the i-th ordering sequence and an (i+1)-th ordering sequence conforms to a first strict monotonicity. The processing module 620 includes a memory 621 and a processor 622. The memory 621 is used for storing a programming code of the operating system. The processor 622 is used for reading and executing the programming code of the operating system, and then receiving and filtering the signals P1~Pm obtained by the sensing module 610. The processor 622 is used for determining whether an (i+2)-th ordering sequence conforms to a second strict monotonicity, and for determining whether an (i+3)-th ordering sequence conforms to the second strict monotonicity. If the processor 622 determined that the (i+2)-th ordering sequence conforms to the second strict monotonicity but the (i+3)-th ordering sequence does not conform to the second strict monotonicity, then the processor 622 deletes a signal obtained at an (i+3)-th time point.

The present embodiment of the invention differs with the third embodiment in that the input layer 410 does not use a processor, so the elements and cost used in the electronic device are reduced.

Fourth Embodiment

Referring to FIG. 4, in the present embodiment of the invention, the signal filtering method is implemented in the application layer 430 of FIG. 4. The driving layer 420 includes a processor and a memory. The application layer 430 is an application program. When the processor executes the application program, the signal filtering method of the invention is executed.

Figure 7:
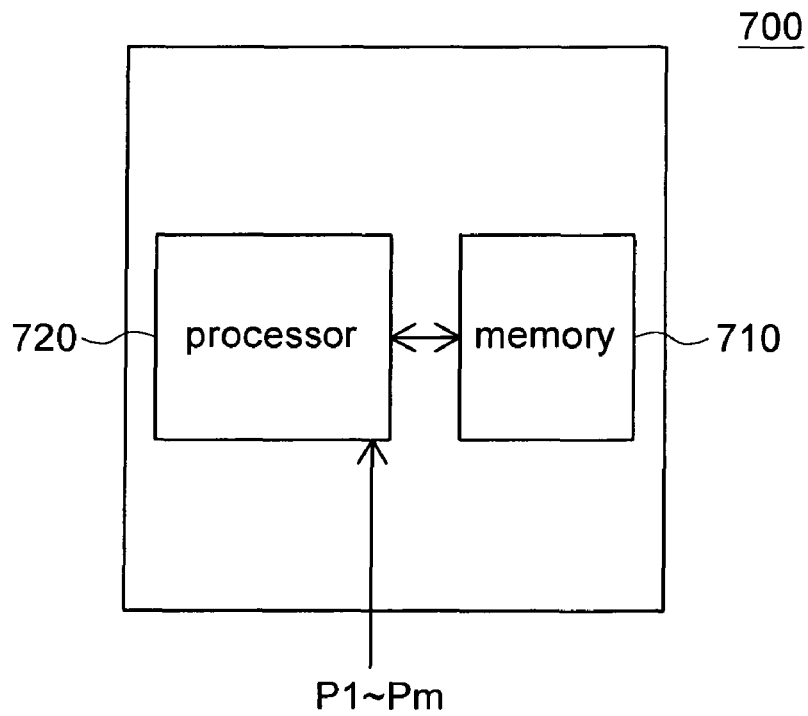
FIG. 7 shows an electronic device according to a fourth embodiment of the invention.

FIG. 7 shows an electronic device according to a fourth embodiment of the invention. Referring to FIG. 7, the electronic device 700 is used for executing the application program to filter a number of signals P1-Pm obtained at a number of time points having an equal interval between two adjacent time points. Each of the signals P1-Pm obtained at an i-th time point of the above time points corresponds to an i-th value, wherein i is a positive integer, and each of the i-th ordering sequence and an (i+1)-th ordering sequence conforms to a first strict monotonicity. The electronic device 700 includes a memory 710 and a processor 720. The memory 710 is used for storing a programming code of an operating system. The processor 720 is used for reading and executing the programming code of the operating system, and then executing the application program to filter the signals P1-Pm. The processor 720 is used for determining whether an (i+2)-th ordering sequence conforms to a second strict monotonicity, and for determining whether an (i+3)-th ordering sequence conforms to the second strict monotonicity. If the processor 720 determined that the (i+2)-th ordering sequence conforms to the second strict monotonicity but the (i+3)-th ordering sequence does not conform to the second strict monotonicity, then the processor 720 deletes a signal obtained at an (i+3)-th time point.

In the present embodiment of the invention, only when the processor executes a particular application program will the signal filtering method of the invention be executed. The present embodiment of the invention differs with the second and the third embodiment in that the electronic device determines whether to execute the signal filtering method according to different needs of the application program. Thus, it is more flexible for the designers to design the electronic device of the present embodiment of the invention.

The signal filtering method disclosed in the above embodiments of the invention can be used in an electronic device for executing an application program with stored digital data, such that after the digital data is loaded and executed in an electronic device, the electronic device executes the signal filtering method of the invention. The abovementioned electronic device can be used in a smart phone, a touch phone, a personal digital assistant (PDA), or a PDA phone.

In the signal filtering method and electronic device disclosed in the above embodiment of the invention, the signals, which are obtained due to interference signals, high power signals, or environmental influences, can be filtered. Therefore, undesired operations of the electronic device can be avoided, power consumption can be decreased, and the operation stability of the electronic device can be enhanced. Moreover, the signal filtering method and electronic device disclosed in the above embodiment of the invention can further improve system stability, and the usability for the user by way of filtering unexpected signals sensed by the fetching unit due to improper operation of the user.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal filtering method provided for filtering a plurality of signals obtained by an electronic device at a plurality of time points, wherein each of the signals obtained at an i-th time point of the above time points corresponds to an i-th value, the i-th value and an (i+1)-th value are defined as an i-th ordering sequence, i is a positive integer, each of the i-th ordering sequence and an (i+1)-th ordering sequence conforms to a first strict monotonicity, and the method comprises:
    (a) determining whether an (i+2)-th ordering sequence conforms to a second strict monotonicity, and executing step (b) if the (i+2)-th ordering sequence conforms to the second strict monotonicity; and
    (b) determining whether an (i+3)-th ordering sequence conforms to the second strict monotonicity, and deleting a signal obtained at an (i+3)-th time point if the (i+3)-th ordering sequence does not conform to the second strict monotonicity.

2. The method according to claim 1, wherein before the step (a), the method comprises:
    (a0) determining whether the two values of the (i+2)-th ordering sequence are equal to each other, and deleting the signal obtained at the (i+3)-th time point if the two values of the (i+2)-th ordering sequence are equal to each other.

3. The method according to claim 1, wherein before the step (b), the method comprises:
    (b0) determining whether the two values of the (i+3)-th ordering sequence are equal to each other, and deleting a signal obtained at an (i+4)-th time point if the two values of the (i+3)-th ordering sequence are equal to each other.

4. The method according to claim 1, wherein the step (a) comprises:
    outputting the signals obtained at the (i+1)-th time point, the (i+2)-th time point, and the (i+3)-th time point if it is determined that the (i+2)-th ordering sequence does not conform to the second strict monotonicity.

5. The method according to claim 1, wherein the step (b) comprises:
    outputting the signals obtained at the (i+1)-th time point, the (i+2)-th time point, and an (i+3)-th time point if it is determined that the (i+3)-th ordering sequence conforms to the second strict monotonicity.

6. The method according to claim 1, wherein the first strict monotonicity is one of strict monotonic increasing and strict monotonic decreasing, and the second strict monotonicity is the other one of strict monotonic increasing and strict monotonic decreasing.

7. An electronic device, comprising:
    a fetching unit for fetching a plurality of signals obtained at a plurality of time points having an equal interval between two adjacent time points, wherein each of the signals obtained at an i-th time point of the above time points corresponds to an i-th value, the i-th value and an (i+1)-th value are defined as an i-th ordering sequence, i is a positive integer, and each of the i-th ordering sequence and an (i+1)-th ordering sequence conforms to a first strict monotonicity;
    a determining unit for determining whether an (i+2)-th ordering sequence conforms to a second strict monotonicity, and for determining whether an (i+3)-th ordering sequence conforms to the second strict monotonicity; and
    a filtering unit for filtering the signals obtained by the fetching unit, wherein if the determining unit determines that the (i+2)-th ordering sequence conforms to the second strict monotonicity but the determining unit determines that the (i+3)-th ordering sequence does not conform to the second strict monotonicity, then the filtering unit deletes a signal obtained at an (i+3)-th time point.

8. The device according to claim 7, wherein the determining unit is further for determining whether the two values of the (i+2)-th ordering sequence are equal to each other, and the filtering unit deletes the signal obtained at the (i+3)-th time point if the two values of the (i+2)-th ordering sequence are equal to each other.

9. The device according to claim 7, wherein the determining unit is further used for determining whether the two values of the (i+3)-th ordering sequence are equal to each other, and the filtering unit deletes a signal obtained at an (i+4)-th time point if the two values of the (i+3)-th ordering sequence are equal to each other.

10. The device according to claim 7, wherein if the determining unit determines that the (i+2)-th ordering sequence does not conform to the second strict monotonicity, the filtering unit outputs the signals obtained at the (i+1)-th time point, the (i+2)-th time point, and the (i+3)-th time point.

11. The device according to claim 7, wherein if the determining unit determines that the (i+3)-th ordering sequence conforms to the second strict monotonicity, the filtering unit outputs the signals obtained at the (i+1)-th time point, the (i+2)-th time point and an (i+3)-th time point.

12. The device according to claim 7, wherein the first strict monotonicity is one of strict monotonic increasing and strict monotonic decreasing, and the second strict monotonicity is the other one of strict monotonic increasing and strict monotonic decreasing.

13. The device according to claim 7, further comprising:
    a display unit for displaying a frame; and
    a controlling unit for determining a control mode according to the signals outputted from the filtering unit to control the content of the frame displayed by the display unit.

14. The device according to claim 13, wherein the frame has a cursor and the control mode is a direction mode used for controlling the cursor's moving direction in the frame.

15. The device according to claim 14, wherein the frame is a one-dimensional frame and the direction mode is used for controlling the cursor to move forward or backward in the one-dimensional frame.

16. The device according to claim 14, wherein the frame is a two-dimensional frame and the direction mode is used for controlling the cursor's coordinate in the two-dimensional frame.

17. The device according to claim 7, wherein the fetching unit comprises a sensing wheel for fetching the signals by way of sensing.

18. An electronic device used for an application program to filter a plurality of signals obtained at a plurality of time points having an equal interval between two adjacent time points, wherein each of the signals obtained at an i-th time point of the above time points corresponds to an i-th value, the i-th value and an (i+1)-th value are defined as an i-th ordering sequence, i is a positive integer, each of the i-th ordering sequence and an (i+1)-th ordering sequence conforms to a first strict monotonicity, and the electronic device comprises:
  a memory for storing a programming code of an operating system; and
  a processor used for reading and executing the programming code of the operating system and then executing the application program to filter the signals, wherein the processor is for determining whether an (i+2)-th ordering sequence conforms to a second strict monotonicity, and for determining whether an (i+3)-th ordering sequence conforms to the second strict monotonicity, and if the processor determined that the (i+2)-th ordering sequence conforms to the second strict monotonicity but the (i+3)-th ordering sequence does not conform to the second strict monotonicity, then the processor deletes a signal obtained at an (i+3)-th time point.

19. The electronic device according to claim 18, wherein the processor is further for determining whether the two values of the (i+2)-th ordering sequence are equal to each other, and deleting the signal obtained at the (i+3)-th time point if the two values of the (i+2)-th ordering sequence are equal to each other.

20. The electronic device according to claim 18, wherein the processor is further for determining whether the two values of the (i+3)-th ordering sequence are equal to each other, and deleting a signal obtained at an (i+4)-th time point if the two values of the (i+3)-th ordering sequence are equal to each other.

21. The electronic device according to claim 18, wherein the processor is further for outputting the signals obtained at the (i+1)-th time point, the (i+2)-th time point and the (i+3)-th time point if the processor determines that the (i+2)-th ordering sequence does not conform to the second strict monotonicity.

22. The electronic device according to claim 18, wherein the processor is further for outputting the signals obtained at the (i+1)-th time point, the (i+2)-th time point and an (i+3)-th time point if the processor determines that the (i+3)-th ordering sequence conforms to the second strict monotonicity.

* * * * *